United States Patent [19]

Nowell et al.

[11] 4,446,624
[45] May 8, 1984

[54] SINGLE HANDED SET-UP APPARATUS

[75] Inventors: Larry H. Nowell, Chula Vista; Robert Halley, LaJolla, both of Calif.

[73] Assignee: The United States of America as represented by the Secretary of the Navy, Washington, D.C.

[21] Appl. No.: 411,777

[22] Filed: Aug. 26, 1982

[51] Int. Cl.³ .............................................. G01B 3/04
[52] U.S. Cl. .................................... 33/1 C; 33/476; 33/494; 235/61 NV; 434/30
[58] Field of Search .............. 33/1 B, 1 C, 1 SD, 431, 33/474, 476, 494, 420; 235/61 NV; 434/2, 25, 30, 12

[56] References Cited

U.S. PATENT DOCUMENTS

| | | | |
|---|---|---|---|
| 364,508 | 6/1887 | Griffiths | 33/482 |
| 777,770 | 12/1904 | Barnes | 33/474 |
| 1,523,919 | 1/1925 | Vitek et al. | 33/474 |
| 2,534,288 | 12/1950 | Merriam | 33/431 |
| 2,979,821 | 4/1961 | Tengwall | 33/1 SD |
| 3,604,118 | 9/1971 | Miller | 33/474 |

Primary Examiner—William D. Martin, Jr.
Attorney, Agent, or Firm—Robert F. Beers; Robert W. Adams; Robert J. Veal

[57] ABSTRACT

A template, for use in conjunction with a radar presentation to train an air intercept controller in coordinating aircraft movements, defines spatial relationships between aircraft symbols presented on the radar through range and separation scales and position cues imprinted on the template. The template also has a series of apertures which allow direct marking of aircraft position on the radar scope without removing the template.

8 Claims, 1 Drawing Figure

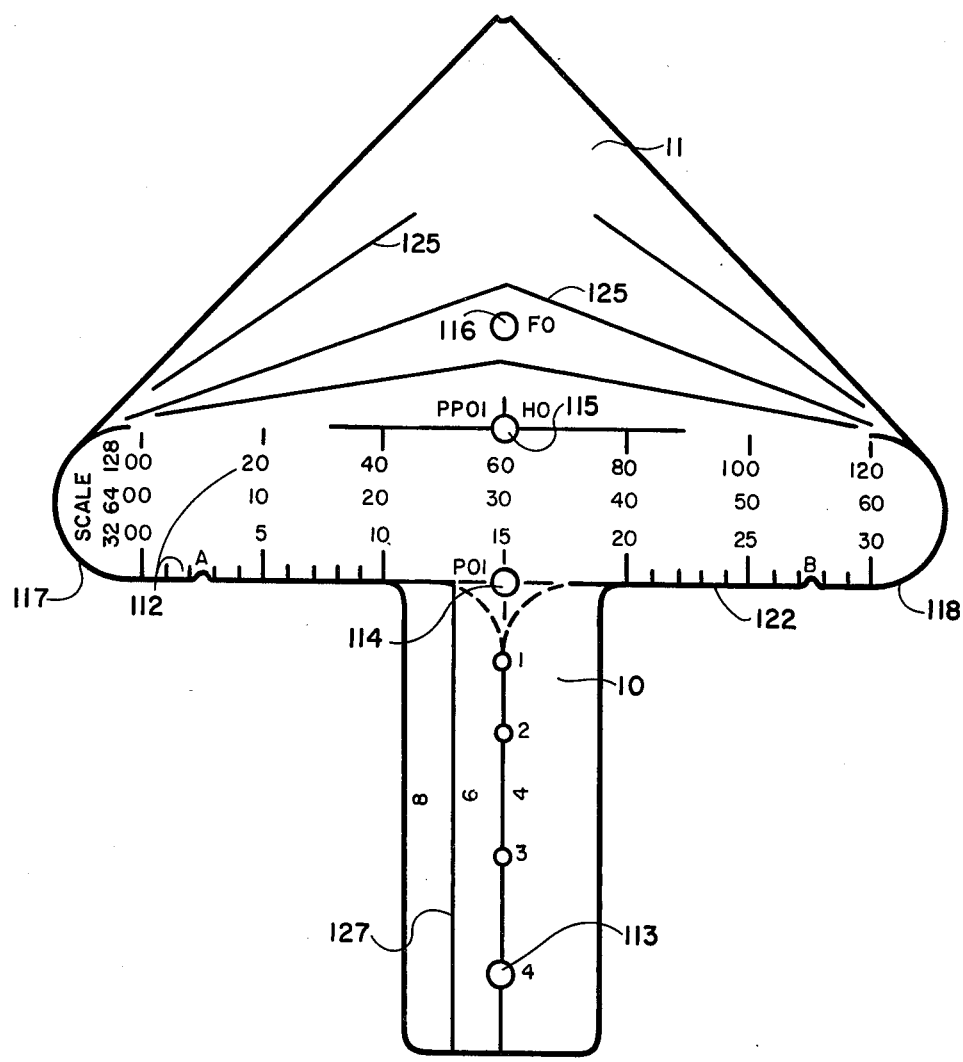

SINGLE HANDED SET-UP APPARATUS

FIELD OF THE INVENTION

The present invention relates to aircraft nagivation in general and to controlled aircraft intercept navigation in particular. More particularly, the present invention relates to the set-up and coordination of a plurality of aircraft for air combat training under the guidance of an air intercept controller. In still greater particularity, the present invention may be described as a training device used in conjunction with a radar scope for the training of air intercept control personnel in the set-up and coordination of the movement of combat aircraft within a gaming area.

DESCRIPTION OF THE PRIOR ART

There are no known examples of similar devices which have been developed as training aids. There are a number of navigational aids which are operationally useful in obtaining the solution to a number of navigational problems, primarily dealing with wind speed and direction, and ground track.

U.S. Pat. No. 2,534,288 issued to C. W. Merriam on Dec. 19, 1950 shows a maneuvering board attachment which can be used to determine relative and true speed, and heading information of another vehicle. However, it is not amenable for direct use on a radarscope.

SUMMARY OF THE INVENTION

The present invention is a template of a clear resilient material with various distance, bearing, and position cues imprinted thereon. Said cues are used in conjunction with the radarscope to reinforce relative motion and position relationships of aircraft for the trainee air intercept controller.

It is an object of this invention to provide a simple training tool for an air intercept controller trainee.

Another object of the invention is to provide a simple device for determining range and bearing data from a radarscope.

Yet another object of the invention is to provide assistance in controlling the movement of aircraft within the operating area.

The features of the invention desired to be protected are set forth in the appended claims. The invention itself, together with further objects and advantages thereof, may best be understood by referring to the following description taken in conjunction with the drawing.

BRIEF DESCRIPTION OF THE DRAWING

The FIGURE is a frontal view of the template.

DESCRIPTION OF THE PREFERRED EMBODIMENT

In the training environment or the operational environment, the Air Intercept Controller (AIC) is charged with correlating the movements of at least two aircraft: a controlling air pilot (CAP) and the maneuvering aircraft (MAC). The AIC's primary aide in so doing is the presentation rendered by his radarscope. He must learn to make range and bearing determinations from the presentation, and he must control the aircraft in the operating area based on the presentation. In order to do this, the AIC must control entry to the operating area and utilize the enclosed airspace without excursions beyond pre-established boundaries, perform set-up planning in terms of intercepts, separation between aircraft, and target aspect angle, as well as coordinating rendezvous.

In order to perform these functions he must develop expertise in visualizing spatial relationships based on the radar presentation. The present invention aids in the development of this expertise by allowing the trainee to use a visual "crutch."

The radarscope typically has a centrally oriented scan which paints video symbols of aircraft at their respective positions on a circular presentation. Around the presentation is a rotatable magnetic bearing ring which is constantly oriented to magnetic north and which has a graduated scale thereon indicative of magnetic bearings.

The set-up apparatus is a clear template as illustrated in the FIGURE. It is formed in the shape of a triangle 11 having a base stem 10 extending therefrom in such a manner as to bisect the hypotenuse 122 of triangle 11. Parallel to hypotenuse 122 is a plurality of scales 112 corresponding to range scales which may be selected on the radarscope.

Along the centerline of stem 10 and extending into triangle 11 is a series of apertures 113, 114, 115, 116 through which a marker may access the radarscope face. Between apertures 113 and 114, intermediate points "1", "2", and "3" are printed on the template. Aperture 113 is labeled "4" on the template; aperture 114 is labeled POI; aperture 115 is labeled PPOI and HO; and aperture 116 is labeled FO. Parallel to the centerline of stem 10 are separation lines 127 imprinted on the template and labeled "4", "6", and "8". Indentations "A" and "B" are equidistant from stem 10 on hypotenuse 122. Triangle corners 117 and 118 are rounded to approximate and turning radius of an aircraft. The following procedures are illustrative of those employed to utilize the device in determining various parameters.

The bearing of the MAC from the CAP may be determined by aligning hypotenuse 122 within the CAP video symbol on the radar presentation. While maintaining alignment with the CAP video signal, hypotenuse 122 is aligned with the MAC video symbol. Without varying the angular relationship, transpose the template to the center of the radarscope. Maintaining the angular relationship, transpose the template along a line parallel to hypotenuse 122 to intersect the magnetic bearing circle. The template should be moved from the CAP to the MAC in order to determine bearing of MAC from CAP. The bearing is read at the intersection of hypotenuse 122 and the bearing circle.

To coordinate the entry of the CAP and MAC into the operating area:

project the aircraft track in the direction of travel;

place the template over the aircraft symbol;

transpose the template into the area such that points "A" and "B" and the outside edges of the template are in the operating area;

mark points "A", "B", and "PPOI" on the radarscope, then mark point "1" through the "POI" aperture 114;

vector both aircraft to the point "1" spot;

when the aircraft reach point "1", vector CAP to point "A" and MAC to point "B".

When the aircraft reach points "A" and "B" they can be vectored for intercepts within the operating area.

Air to air intercepts may be set up at varying aspect angles from 10° to 45° by vectoring the CAP and MAC to points "A" and "B", then vectoring the aircraft to the Planned Point of Intercept (PPOI) location. The PPOI is varied by transposing the template to place one of the intermediate points "1", "2" or "3" or aperture 113 over the original position of aperture 114 and marking the PPOI through aperture 115. Target aspect lines 125 are imprinted on triangle 11 to assist the trainee in visualizing the aircraft course.

Separation lines 127 imprinted on stem 10 are useful in drawing lateral separation lines for use in rendezvous planning, since they are premeasured separation lines.

The above procedures serve to illustrate the basic techniques for using the single handed set-up apparatus, from which more complex techniques may readily be discerned by those familiar with air navigation and air traffic control.

While a preferred embodiment has been shown and described, various modifications and substitutions may be made thereto without departing from the spirit and scope of the invention which are embodied in the appended claims.

What is claimed is:

1. A training device for training aircraft intercept operators in the use of a radarscope to coordinate the movement of a plurality of aircraft, comprising:
    a template formed in the shape of a triangle having a base stem extending therefrom such that said stem bisects the hypotenuse of said triangle;
    said triangle having imprinted thereon a plurality of range scales;
    said stem having imprinted thereon longitudinal lines at predetermined separation; and
    said template having a series of apertures along the centerline of said stem extending into said triangle.

2. The training device of claim 1, wherein said triangle has imprinted thereon aspect lines indicative of the target aspect of an air to air intercept, said lines being used in conjunction with said apertures to set up intercepts of from 10° to 45°.

3. The device of claim 2, wherein said triangle has a pair of designated indentations on said hypotenuse, symmetrically positioned about said stem.

4. The device of claim 3, wherein said longitudinal lines are separated by known increments based on said range scales.

5. The device of claim 4, wherein said triangle has its acute angles rounded to represent a scaled turning radius.

6. A device for training air intercept operators on a radar in directed aircraft control comprising a triangular template having a rectangular template extension therefrom bisecting the hypotenuse of said triangle template, said template having range scales and intercept indicia imprinted thereon.

7. The device of claim 6, wherein said range scales are incremented correspondingly with the range scales on said radar.

8. The device of claim 7, wherein said templates have a series of apertures through which said operator may mark aircraft positions and planned positions on said radar.

* * * * *